US007589768B2

(12) United States Patent
Morimoto

(10) Patent No.: US 7,589,768 B2
(45) Date of Patent: Sep. 15, 2009

(54) IMAGE-TAKING APPARATUS AND FOCUS CONTROL METHOD OF IMAGE-TAKING APPARATUS WITH FIRST AND SECOND CONTROL METHOD IN FIRST ZOOM STATE AND ONLY SECOND CONTROL METHOD IN SECOND ZOOM STATE

(75) Inventor: Yosuke Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 10/985,929

(22) Filed: Nov. 12, 2004

(65) Prior Publication Data
US 2005/0104994 A1 May 19, 2005

(30) Foreign Application Priority Data
Nov. 19, 2003 (JP) .............................. 2003-389982

(51) Int. Cl.
H04N 5/262 (2006.01)
H04N 5/232 (2006.01)
G03B 13/00 (2006.01)

(52) U.S. Cl. ..................... 348/240.1; 348/347; 348/349

(58) Field of Classification Search ............. 348/240.1, 348/240.99–240.3, 345, 347–350, 353–4, 348/356; 396/121
See application file for complete search history.

(56) References Cited

U.S. PATENT DOCUMENTS 5,933,187 A * 8/1999 Hirasawa et al. ....... 348/240.99

7,046,290 B2 * 5/2006 Nozaki ........................ 348/350
7,116,364 B2 * 10/2006 Battles et al. ............. 348/240.1
2004/0037546 A1 * 2/2004 Nonaka ....................... 396/121
2005/0036775 A1 2/2005 Morimoto ..................... 396/67
2005/0046711 A1 3/2005 Morimoto ................. 248/240.2

FOREIGN PATENT DOCUMENTS

JP       2001-166199       6/2001
JP       2002-258147       9/2002
JP       3381233 B2       2/2003

* cited by examiner

Primary Examiner—Sinh Tran
Assistant Examiner—Daniel M Pasiewicz
(74) Attorney, Agent, or Firm—Fitzpatrick, Cella, Harper & Scinto

(57) ABSTRACT

An image-taking apparatus is disclosed which can achieve an appropriate AF control regardless of a zoom magnification. The image-taking apparatus has an image pickup element which photoelectrically converts an image of an object formed by an image-taking optical system including a focusing lens, and a signal processing circuit which produces an image signal based on an output signal from the image pickup element and has an electronic zoom function of electrically processing a part of the image signal to produce an enlarged output image. The image-taking apparatus also has a detection unit which detects a defocus amount between two image of the object, and a focus control circuit which controls a drive of the focusing lens in a first control method based on the output signal from the image pickup element and a second control method based on an output signal from the detection unit.

4 Claims, 5 Drawing Sheets

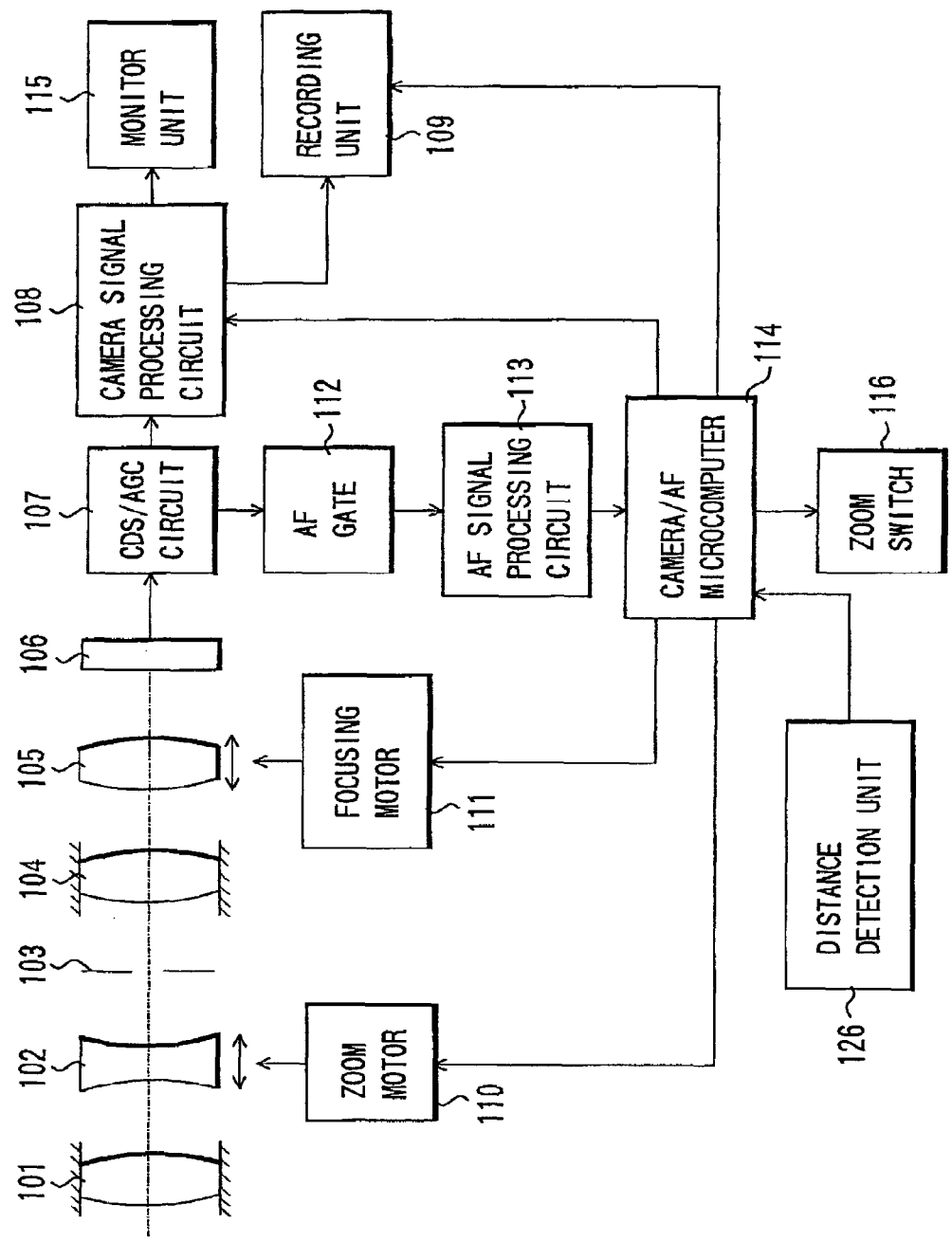

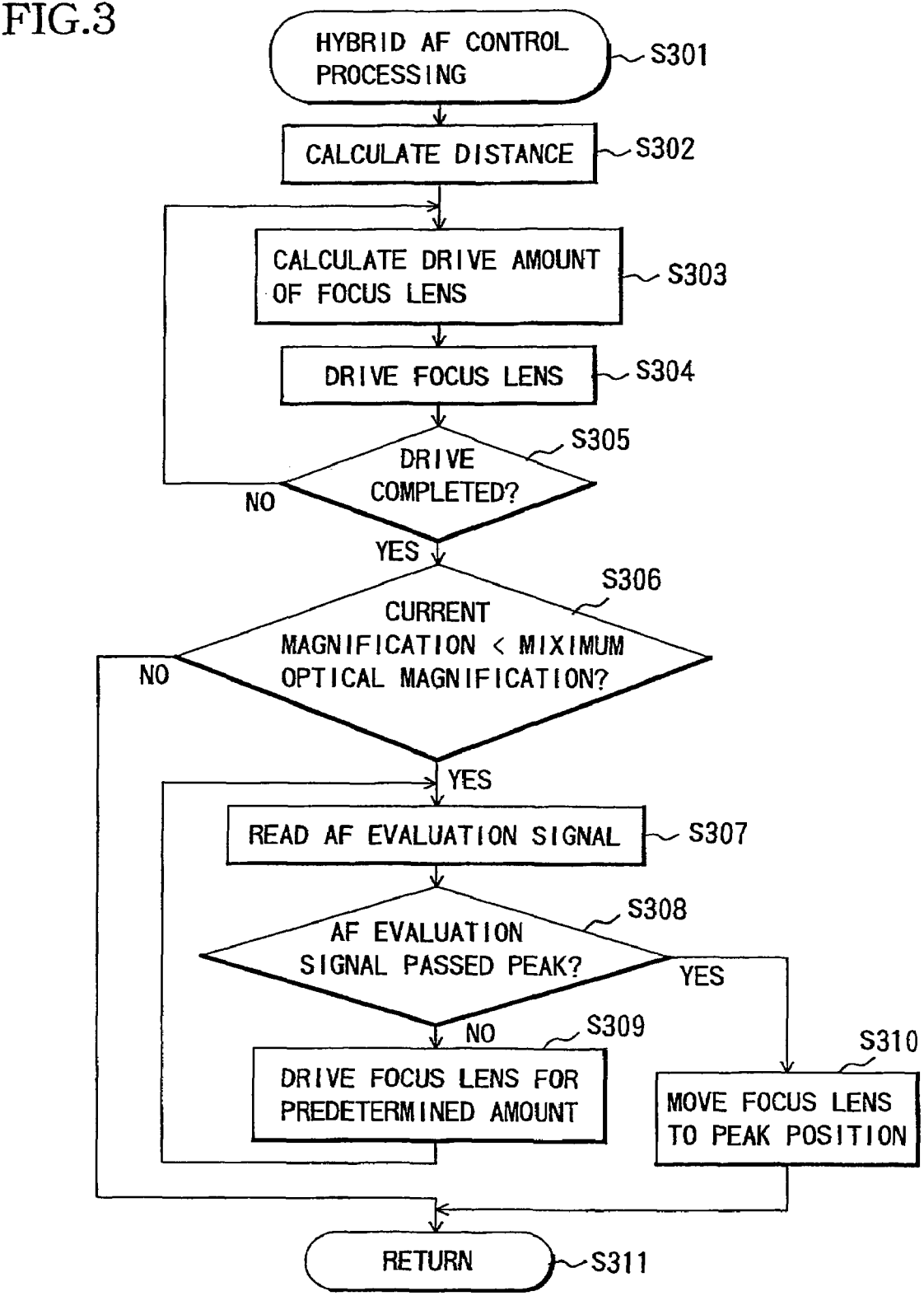

IMAGE-TAKING APPARATUS AND FOCUS CONTROL METHOD OF IMAGE-TAKING APPARATUS WITH FIRST AND SECOND CONTROL METHOD IN FIRST ZOOM STATE AND ONLY SECOND CONTROL METHOD IN SECOND ZOOM STATE

BACKGROUND OF THE INVENTION

1. Field of the Invention

The present invention relates to focus control of an image-taking apparatus.

2. Description of the Related Art

A hybrid auto-focus (AF) control method is one of AF control methods for use in image-taking apparatuses such as a video camera. As disclosed in Japanese Patent Application Laid-Open No. 2002-258147, the hybrid AF control method is a combination of a so-called TV-AF method in which a focusing lens is controlled to maintain the maximum level of an AF evaluation value signal provided by extracting a high-frequency component (a contrast component) from an output signal of an image pickup element with a control method in which the drive amount of a focusing lens is calculated on the basis of a signal from a sensor which measures the distance to an object or a defocus amount.

The TV-AF method allows high focusing accuracy but it is necessary to take a long time to achieve focusing to search for the lens position at which the AF evaluation value signal is at the maximum. In the hybrid AF control method, the signal of the separately provided sensor is used for reference to seek a reduction in the time to achieve focusing.

Japanese Patent Application Laid-Open No. 2002-258147 has also proposed, as an exemplary structure of the hybrid AF, a combination of the TV-AF method with a TTL (Through The Lens) method in which light incident on an image-taking optical system is split and received by sensors to measure a defocus amount based on signals which represent the received light. In addition, Japanese Patent Application Laid-Open No. 2002-258147 has proposed a combination of the TV-AF method with an external metering method in which a distance sensor is provided separately from an image-taking optical system.

In the external metering method, a so-called parallax problem is known due to a mismatch between the optical axis of the image-taking optical system and the measuring axis of the distance sensor. For example, when a zoom lens is set on a telephoto side, the field angle for taking images is reduced, and the distance sensor may detect a substance out of the field angle as a target object.

For a camera having the maximum zoom magnification which is relatively low, however, the field angle for image-taking is not very small and only slight effect is caused. Japanese Patent No. 3381233 has proposed a means for overcoming the parallax problem by using a sensor which emits a radiation beam and receives the reflected beam from an object as a distance sensor to determine whether or not the object is placed on an optical axis from the relationship between the emergence angle and the incident angle of the reflected beam. While this means is disadvantageous in cost as compared with a distance sensor used in a conventional compact camera or the like, a hybrid AF control method can be realized which does not perform erroneous detection of an object due to parallax in a camera having a high level of the maximum zoom magnification.

Recent digital cameras and video cameras have an electronic zoom function in which electric processing is used to enlarge a part of an object image taken by an image pickup element such as a CCD sensor and a CMOS sensor for display and record. The electronic zoom function achieves zooming through electric processing beyond the optical zoom magnification of an image-taking optical system (approximately 10 to 20 times in a video camera) to allow pseudo zooming up to a zoom magnification of several tens to 200 times or more.

When such an electronic function is used to enlarge an area of video through electric processing, and the TV-AF control method or the hybrid AF control method involving the TV-AF control method is applied to the enlarged video area, the following problem arises.

Specifically, since only part of the video signal of an object is used in an electronic zoom state, a smaller area of the video is used for calculating the AF evaluation value signal than in a non-electronic zoom state. With the small video area, a slight movement of an object or a small shake of a hand which holds a camera largely changes the video of the object in the video area.

As described above, focusing control is performed in the TV-AF control method by searching for the lens position at which the AF evaluation value signal is at the maximum. The AF evaluation value signal, however, varies with a change in video of an object, so that a large change in the video may lead to erroneous operation of the AF control. For this reason, in the hybrid AF control method involving the TV-AF control method, degraded AF performance in the electronic zoom state presents a problem.

Detailed description is hereinafter made for the problem with reference to FIGS. 2A to 2C. FIG. 2A shows an image taking area in the non-electronic zoom state. In the TV-AF, signal processing is performed on the video signal within a predetermined area (an AF frame), for example near the center, of the image taking area to calculate the AF evaluation value signal for use in AF control.

On the other hand, FIG. 2B shows an example of an image taking area in the electronic zoom state, and FIG. 2C shows an example of an area enlarged and displayed in the electronic zoom state. Since the video in the enlarged area shown in FIG. 2C is displayed and recorded, an AF frame is set in the enlarged image taking area shown in FIG. 2C to have the same size as that in FIG. 2A. In this case, as shown in FIG. 2B, the size of the AF frame in the actual image taking area is smaller than that in the non-electronic zoom state. In this manner, the AF frame becomes smaller as the electronic zoom magnification becomes higher, and consequently, erroneous operation of the TV-AF control easily occurs due to a change in video of an object as described above.

SUMMARY OF THE INVENTION

It is an object of the present invention to provide an image-taking apparatus which performs hybrid AF control for reducing degraded AF performance in an electronic zoom state, and a control method of the image-taking apparatus.

According to one aspect, the present invention provides an image-taking apparatus having an image pickup element which photoelectrically converts an image of an object formed by an image-taking optical system including a focusing lens and a signal processing circuit which produces an image signal based on an output signal from the image pickup element and has an electronic zoom function of electrically processing a part of the image signal to produce an enlarged output image. The image-taking apparatus also has a detection unit which detects a defocus amount between two image of the object and a focus control circuit which controls a drive of the focusing lens in a first control method based on the output signal from the image pickup element and a second control method based on an output signal from the detection unit. The focus control circuit uses both of the first control method and the second control method in a first zoom state including at least a state in which the electronic zoom function is not used, and uses only the second control method in a second zoom state in which the electronic zoom function is used to set a zoom magnification larger than a zoom magnification in the first zoom state.

According to one aspect, the present invention provides a focus control method of an image-taking apparatus: wherein the image-taking apparatus has a first step, a second step, and a third step. The image-taking apparatus has an image pickup element which photoelectrically converts an image of an object formed by an image-taking optical system including a focusing lens, a signal processing circuit which produces an image signal based on an output signal from the image pickup element and has an electronic zoom function of electrically processing a part of the image signal to produce an enlarged output image, and a detection unit which detects a defocus amount between two image of the object. In the first step, a drive of the focusing lens is controlled in a first control method based on the output signal from the image pickup element. In the second step, the drive of the focusing lens is controlled in a second control method based on an output signal from the detection unit. In the third step, the control methods are changed such that both of the first control method and the second control method are used in a first zoom state including at least a state in which the electronic zoom function is not used, and only the second control method is used in a second zoom state in which the electronic zoom function is used to set a zoom magnification larger than a zoom magnification in the first zoom state.

These and other characteristics of the image-taking apparatus and the control method will be apparent from the following description of specific embodiments with reference to the drawings.

BRIEF DESCRIPTION OF THE DRAWINGS

FIG. 1 is a block diagram showing the structure of an image-taking apparatus which is Embodiment 1 of the present invention;

FIG. 3 is a flow chart showing an AF control processing in the image-taking apparatus of Embodiment 1;

DETAILED DESCRIPTION OF THE PREFERRED EMBODIMENTS

Embodiment 1

Figure 2A:
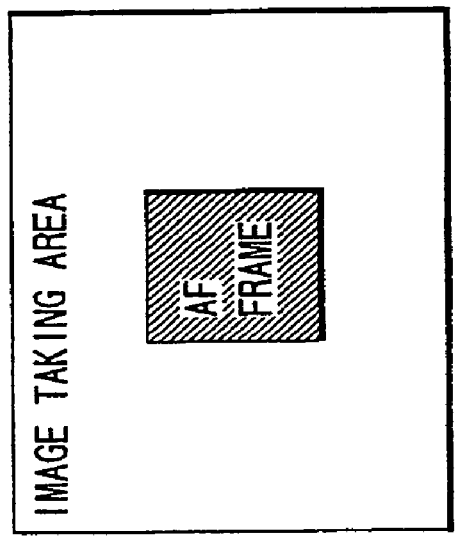
FIGS. 2A to 2C show a comparison between AF frames in a non-electronic zoom state and an electronic zoom state.
Figure 2B:
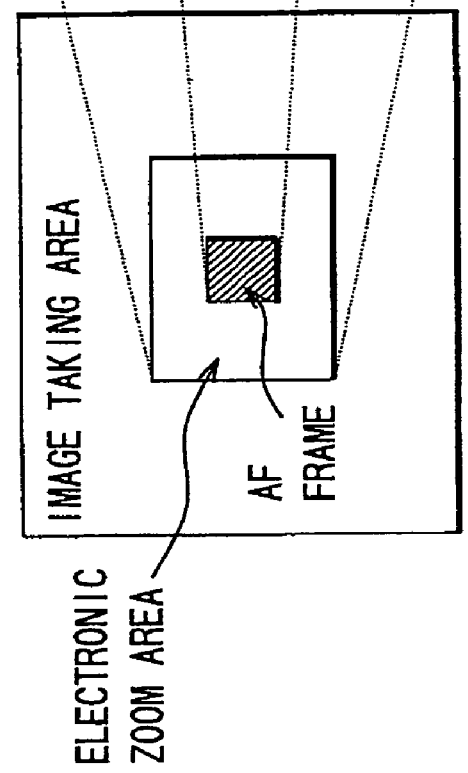
Figure 2C:
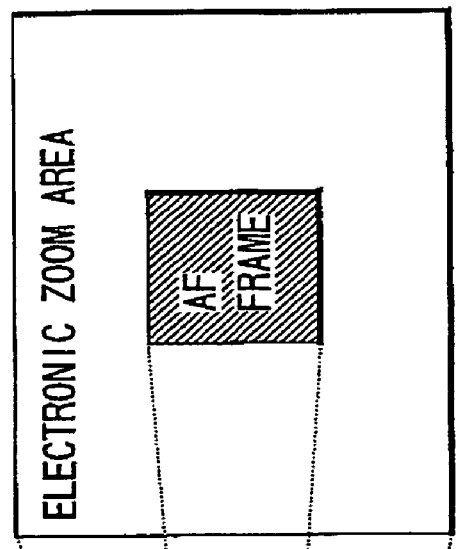

FIG. 1 shows the structure of an image-taking apparatus which is Embodiment 1 of the present invention. While this Embodiment is described for the image-taking apparatus integral with an image-taking lens, the present invention is applicable to an image-taking apparatus on which an image-taking lens is mountable. In this case, a control signal produced by a camera/AF microcomputer, later described, is communicated to a lens microcomputer in the image-taking lens such that the lens microcomputer controls the drive of a focusing lens unit. In addition, while a video camera is described in this Embodiment, the present invention is applicable to various types of image-taking apparatuses such as a digital still camera.

In FIG. 1, reference numeral 101 shows a first fixed lens unit, 102 a lens unit (hereinafter referred to as a zoom lens unit) which provides variable magnification, 103 a stop, 104 a second fixed lens unit, and 105 a lens unit (hereinafter referred to as a focusing lens unit) which has both of a focus adjusting function and a so-called compensator function of correcting movements of an image plane due to varied magnification. An image-taking optical system constituted by these lens units is a rear focus optical system which is comprising the four lens units having a positive, a negative, a positive, a positive optical powers in order from an object side (the left side in FIG. 1). It should be noted that, while each lens unit is shown in FIG. 1 as it is formed of a single lens, each lens unit may actually be formed of a single lens or a plurality of lenses.

The zoom lens unit 102 and the focusing lens unit 105 are movable on an optical axis direction (the left-to-right direction in FIG. 1) by a zoom motor 110 and a focusing motor 111, respectively.

Incident light from an object passes through the lens units and the stop 101 to 105 to form an image on an image pickup element 106. The image pickup element 106 is a photoelectrical converting element such as a CCD and a CMOS sensor which converts an object image formed on an image pickup surface into an electric signal. The electric signal output from the image pickup element 106 is read and amplified by a CDS/AGC circuit 107 and input to a camera signal processing circuit 108.

The camera signal processing circuit 108 performs predetermined processing on the signal input from the CDS/AGC circuit 107 to produce a video signal appropriate for record in a recording unit 109 and display on a monitor unit 115. The recording unit 109 records the video signal input thereto on a recording medium such as a magnetic tape, an optical disc, and a semiconductor memory. The monitor unit 115 displays the video of the object on a display such as an electronic viewfinder and a liquid crystal panel based on the video signal input thereto.

On the other hand, the video signal output from the CDS/AGC circuit 107 is also input to an AF gate 112. The AF gate 112 selects a signal component associated with the area of a screen (an AF frame) for use in focus control out of the video signal corresponding to the whole screen, and outputs the selected signal component to an AF signal processing circuit 113. The AF frame can be set arbitrarily, and a plurality of areas may be set.

The AF signal processing circuit 113 extracts, from the input video signal, an AF evaluation value signal such as a high-frequency component and a luminance difference component (a difference between the maximum and minimum in luminance level of the video signal) for use in focus control with the TV-AF method, and outputs the extracted signal to a camera/AF microcomputer 114.

The camera/AF microcomputer 114 outputs a control signal to the focusing motor 111 to drive the focusing lens unit 105 in predetermined amounts in order to search for the position (an in-focus position) of the focusing lens unit 105 at which the AF evaluation value is at the maximum level. This control is the so-called TV-AF method (a first control method).

The camera/AF microcomputer 114 controls the operation of the entire image-taking apparatus. The aforementioned output from the AF signal processing circuit 113 and an output from a distance detection unit 126, later described, are input to the camera/AF microcomputer 114 and used in calculations for AF control. The camera/AF microcomputer 114 outputs the control signal to the aforementioned focusing motor 111 according to the calculation result to drive the focusing lens unit 105.

A distance detection unit 126 is a sensor of a type in which the distance to an object is measured and a signal based on the distance is output. Distance sensors of various types can be used as the distance detection unit 126, such as a passive method, for example a phase difference detection type, and an active method by using a triangulation type wherein irradiating the light to an object and receiving reflected light from the object. As described in the section "DESCRIPTION OF RELATED ART," a sensor of a type which does not detect an object erroneously due to parallax is desirable.

The camera/AF microcomputer 114 calculates a position of the focusing lens unit 105 for achieving focusing based on the information about the distance to the object thus measured and the information about the focal length of the image-taking optical system (an optical zoom magnification), or reads the position from table data, and then drives the focusing lens unit 105 to that position. The control method is referred to as "a distance measuring method" (a second control method).

A zoom switch 116 for allowing a user to perform a zoom operation is connected to the camera/AF microcomputer 114. In response to an operation signal thereof, the camera/AF microcomputer 114 performs an optical zoom control realized by control with the zoom motor 110 described above and an electronic zoom control realized by control with the camera signal processing circuit 108. The camera signal processing circuit 108 has an electronic zoom function of electrically processing a part of the video signal corresponding to the entire screen in response to a signal which indicates an enlargement ratio from the camera/AF microcomputer 114 to output an image enlarged at the magnification in accordance with the enlargement ratio signal. The video signal after the enlargement processing by the camera signal processing circuit 108 is output to the recording unit 115 and the monitor unit 109 described above. Thus, the enlarged image is recorded or displayed on the recording medium or the display of the monitor unit 115. The size of the AF frame set in the AF gate 112 is controlled appropriately in accordance with the electronic zoom magnification.

Next, description is made for control of the optical zoom and the electronic zoom by the camera/AF microcomputer 114 in response to the operation signal of the zoom switch 116 described above with reference to a flow chart of FIG. 5.

Figure 5:
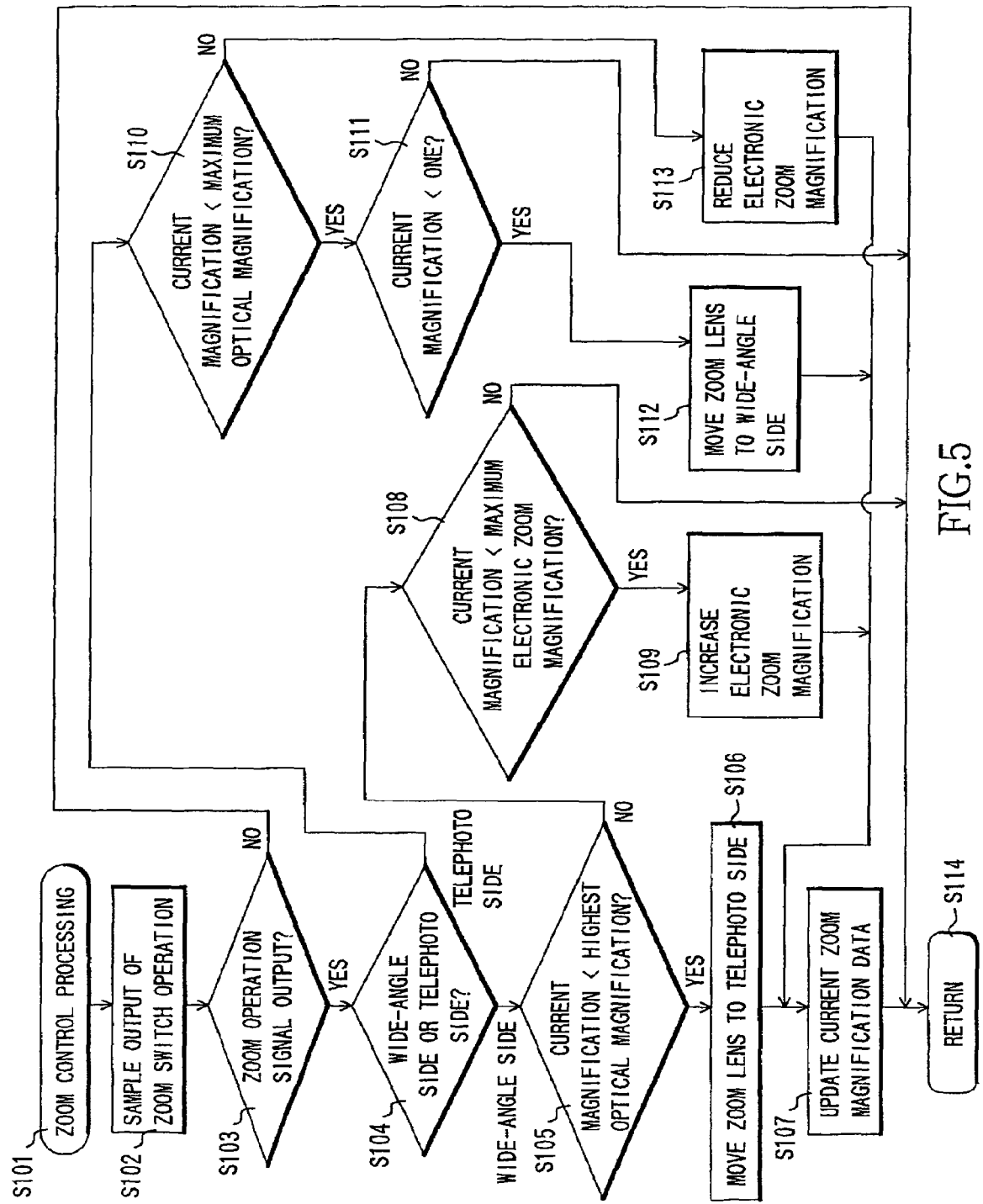
FIG. 5 is a flow chart showing a zoom control processing in the image-taking apparatus of Embodiment 1.

After a power switch (not shown) is turned on at step S101 of FIG. 5, the camera/AF microcomputer 114 first samples an operation signal (a zoom operation signal) from the zoom switch 116 at step S102. At this point, it also reads the data of the current zoom magnification stored in a memory (not shown).

The data of the current zoom magnification for the optical zoom can be provided, for example, by data converted into a zoom magnification based on an output value from a position sensor (not shown) for detecting the position of the zoom lens unit 102 or a drive pulse count value of the zoom motor 110 from a reference position (when the zoom motor 110 is realized by a stepping motor). For the electronic zoom, the zoom magnification can be provided from the previous enlargement ratio data supplied to the camera signal processing circuit 108. The memory has therein the value obtained by multiplying the zoom magnification data for the optical zoom by the zoom magnification data for the electronic zoom.

Next, at step S103, the camera/AF microcomputer 114 determines whether or not a zoom operation signal is output. When the zoom operation signal is not output, the camera/AF microcomputer 114 assumes that a user does not perform zoom operation and the flow proceeds to step S114 to move to a control processing other than the zoom control.

On the other hand, when it is determined that the zoom operation signal is output at step S103, it is determined at step S104 whether or not the zoom operation signal is associated with an operation toward the wide-angle side (for example, a+signal) or an operation toward the telephoto side (for example, a−signal). When the zoom operation signal is associated with the operation toward the telephoto side, that is, the zoom operation is performed toward the telephoto side, it is determined at step S105 whether or not the current zoom magnification is smaller than the maximum optical magnification provided by the image-taking optical system (the movement of the zoom lens unit 102). When it is smaller than the maximum optical magnification, more optical zoom can be performed toward the telephoto side, and thus, at step S106, the zoom motor 110 is controlled to move the zoom lens unit 102 toward the telephoto side. At step S107, the current zoom magnification data stored in the memory is updated, and the flow proceeds to step S114 to move to another control processing.

When it is determined at step S105 that the current zoom magnification is not smaller than the maximum optical magnification, more optical zoom cannot be performed toward the telephoto side, and thus zooming is performed with an electronic zoom control. In this case, the camera/AF microcomputer 114 determines at step S108 whether or not the current zoom magnification is smaller than the maximum zoom magnification (hereinafter referred to as the maximum electronic zoom magnification) provided by the effects (multiplication) of both of the optical zoom and the electronic zoom. When it is smaller than the maximum electronic zoom magnification, the camera/AF microcomputer 104 sends data which indicates an enlargement ratio higher than the current enlargement ratio to the camera signal processing circuit 108 at step S109 to increase the electronic zoom magnification. Then, the current zoom magnification data is updated at step S107 and the flow proceeds to step S114.

When the current zoom magnification reaches the maximum electronic zoom magnification, more electronic zoom cannot be performed toward the telephoto side, and thus the flow proceeds to step S114.

When it is determined at step S104 that the zoom operation is performed toward the wide-angle side, the camera/AF microcomputer 114 determines whether or not the current zoom magnification is smaller than the maximum optical magnification. When it is smaller than the maximum optical magnification, the zoom lens unit 102 is driven toward the wide-angle side with the optical zoom control.

It is determined at step S111 whether or not the current zoom magnification is larger than one (the widest angle: the lowest optical zoom magnification). When it is larger than one, more optical zoom can be performed toward the wide-angle side, and thus the zoom lens unit 102 is driven toward the wide-angle side at step S112. Then, at step S107, the current zoom magnification data is updated and the flow proceeds to step S114.

When the current zoom magnification reaches one, more optical zoom (and the electronic zoom) cannot be performed toward the wide-angle side, and the flow proceeds to step S114.

On the other hand, when it is determined at step S110 that the current zoom magnification is not smaller than the maximum optical magnification, zooming toward the wide-angle side is performed by the electronic zoom control until the maximum optical magnification is reached, so that the camera/AF microcomputer 114 sends data which indicates an enlargement ratio smaller than the current enlargement ratio to the camera signal processing circuit 108 to reduce the electronic zoom magnification at step S113. Then, at step S107, the current zoom magnification data is updated and the flow proceeds to step 114 to move to another control processing.

With the above processing, the user can smoothly perform the zoom operation without particularly noticing switching between the optical zoom and the electronic zoom. Since the image quality is reduced in the electronic zoom as the magnification is larger, a user may make a selection or setting to change the maximum electronic zoom magnification (for example, set one of ×50, ×100, and ×200) or to prevent the electronic zoom temporarily.

While the optical zoom control has been described in association with the movement of the zoom lens unit 102 only, the focusing lens unit 102 is moved simultaneously under control of the focusing motor 111 in an actual rear focus optical system in order to maintain an in-focus state since the movement of the zoom lens unit 102 (varied magnification) causes an image plane to be shifted. The control is performed by calculating information (information representing a position or zoom tracking data representing a trajectory which the focusing lens unit 105 should follow) about the target drive position of the focusing lens unit 105 corresponding to the position to which the zoom lens unit 102 should be moved from the current position after a predetermined time period stored in a memory (not shown), and driving the focusing lens unit 105 based on the information about the target drive position simultaneously with the movement of the zoom lens unit 102. This enables zooming with the in-focus state maintained.

It should be noted that the present invention is applicable not only to the aforementioned image-taking apparatus which employs the control method for the optical zoom/the electronic zoom and the control method for maintaining the image plane but also to an image-taking apparatus which employs another control method.

Next the AF control characteristic of the present invention is described with reference to a flow chart of FIG. 3. Description is made herein for a case where switching is made between the hybrid AF control and the distance measuring AF control depending on whether an electronic zoom function is used or not.

The hybrid AF employed in this Embodiment realizes control such that the focusing lens unit 105 is moved at high speed closer to an in-focus position in the distance measuring method (the second control method), and then the focusing lens unit 105 is moved to the in-focus position in the TV-AF method (the first control method).

First, at step S301 in FIG. 3, when the camera is started in an AF mode or an AF switch (not shown) is turned on, the camera/AF microcomputer 114 calculates the distance to an object based on a signal from the distance detection unit 126 at step S302.

Next, at step S303, the camera/microcomputer 114 calculates the drive amount of the focusing lens unit 105 to achieve focusing based on the calculated object distance, the information about the position of the focusing lens unit 105 at this point (detected by a position sensor, not shown, or the like), and the information about the focus length of the image-taking optical system (the aforementioned information about the position of the zoom lens unit 102). The drive amount may be calculated with a calculation formula or read from the table data.

Next, at step S304, the camera/AF microcomputer 114 starts control for drive of the focusing lens unit 105 (production and output of a control signal). It is determined at step S305 whether or not the drive of the focusing lens unit 105 for the calculated drive amount described above is completed, and the processing at step S304 is repeated until the drive is completed. When the drive is completed, the flow proceeds to step S306. The processing so far described is the focus control in the distance measuring method.

Next, at step S306, the camera/AF microcomputer 114 reads the current zoom magnification data stored in the memory at step S107 described above and determines whether or not it is smaller than the maximum optical magnification. When it is smaller than the maximum optical magnification, the image taking operation is performed in the optical zoom area, that is, in a first zoom state in which the electronic zoom function is not used, so that the flow proceeds to step S307 to start focus control in the TV-AF method.

At step S307, the camera/AF microcomputer 114 takes an AF evaluation value signal from the AF signal processing circuit 113 and stores it in a memory (not shown).

Next, at step S308, it is determined whether or not the AF evaluation value signal is equal to the peak value. Since the only one AF evaluation value signal cannot enable the determination of whether or not it is equal to the peak value, the camera/AF microcomputer 114 repeats the drive of the focusing lens unit 105 for a predetermined amount at step S309 (production and output of the control signal) and the reading of the AF evaluation value signal at step S307, and when the AF evaluation value signal stops increasing and starts reducing, it is determined at step S308 that the AF evaluation value signal passes the peak value. Then, when it is determined that it passes the peak value, the flow proceeds to step S310 to drive the focusing lens unit 105 to the position at which the peak of the AF evaluation value signal is provided. This allows the focusing lens unit 105 to be moved to the position where the AF evaluation value signal is at the maximum, that is, the in-focus position, with high accuracy.

When the in-focus state is achieved in this manner, the flow proceeds to step S311 to move to another camera control processing.

On the other hand, when it is determined at step S306 that the current zoom magnification is larger than the maximum optical magnification, the image taking operation is performed in the electronic zoom area, that is, in a second zoom state in which the electronic zoom function is used, so that the AF control with the TV-AF method may result in erroneous operation. Thus, only the AF control in the distance measuring method is performed in this case, and the flow proceeds to step S311 to move to another camera control processing. With the above control, the erroneous AF operation can be prevented in the electronic zoom state.

In the above description, another camera control processing is not performed until the in-focus state is achieved in order to facilitate the explanation. In reality, however, a video signal processing, a stop control, a record processing on the recording medium and the like are performed as appropriate by means of interrupt or the like.

Figure 4A:
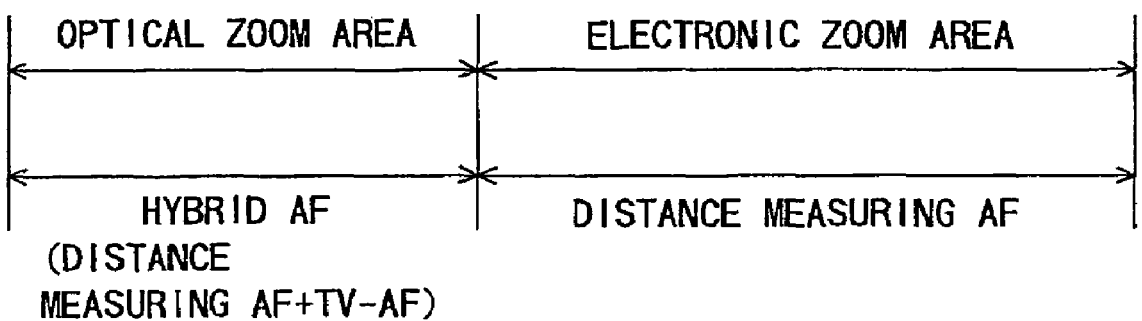
FIGS. 4A and 4B show the concept of switching between control methods used in Embodiment 1.

FIG. 4A shows a switch between the hybrid AF control and the distance measuring AF control in the optical zoom area and the electronic zoom area.

In this Embodiment, the switching is made between the hybrid AF and the distance measuring AF in the optical zoom area and the electronic zoom area. Specifically, the first and second control methods are used when the electronic zoom function is not used, while only the second control method is used when the electronic zoom function is used. However, the present invention is not limited thereto.

Figure 4B:
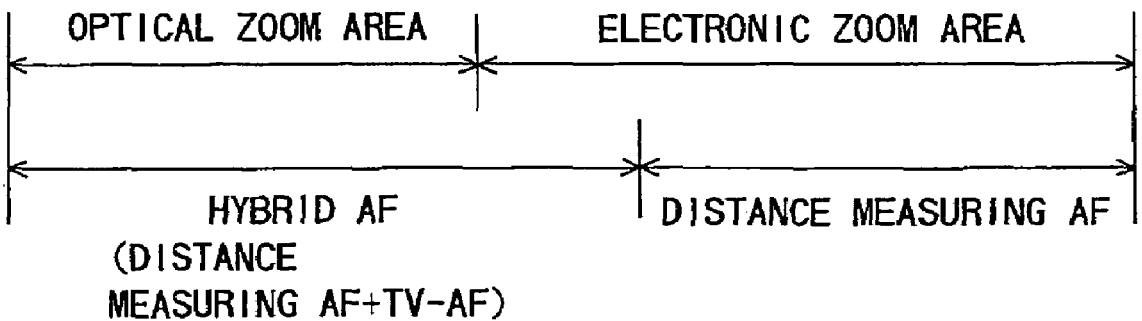

For example, as shown in FIG. 4B, it is possible that the hybrid AF is performed in the optical zoom area and the part of the electronic zoom area, that is, when the electronic zoom function is not used and when the electronic zoom function is used to provide a zoom magnification smaller than a predetermined magnification, while the distance measuring AF is performed when the electronic zoom is used to provide a zoom magnification larger than the predetermined magnification.

With this operation, it is possible to eliminate the possibility of significantly degraded performance of the TV-AF due to a smaller the AF frame only in part of the electronic zoom area in which a large zoom magnification is used, and at the same time, the advantage of the hybrid AF can be ensured in the largest possible zoom area.

According to the present invention, the optimal focus control can be performed for a set zoom magnification over the entire range of variable zoom magnifications including the electronic zoom area.

Particularly, in a case where the first control method is the so-called TV-AF method based on the output signal from the image pickup element and the second control method is the distance measuring method in which the distance detecting means is used, only the distance measuring method is used when the electronic zoom is used to set a large zoom magnification, thereby making it possible to avoid erroneous operation of focus control caused by a smaller video area used for the TV-AF in the electronic zoom.

While the preferred embodiment has been described, it is to be understood that modification and variation of the present invention may be made without departing from the scope of the following claims.

"This application claims priority from Japanese Patent Application No. 2003-389982 filed on Nov. 19, 2003, which is hereby incorporated by reference herein."

What is claimed is:

1. An image-taking apparatus comprising:
   an image pickup element which photoelectrically converts an image of an object formed by an image-taking optical system including a focusing lens;
   a signal processing circuit which produces an image signal based on an output signal from the image pickup element and has an electronic zoom function of electrically processing a part of the image signal to produce an enlarged output image; and
   a focus control circuit which controls a drive of the focusing lens in a first control method based on a contrast component of the output signal from the image pickup element and in a second control method based on a phase difference between two images of the object,
   wherein the focus control circuit uses both of the first control method and the second control method in a first zoom state including at least a state in which the electronic zoom function is not used, and uses only the second control method in a second zoom state in which the electronic zoom function is used to set a zoom magnification larger than a zoom magnification in the first zoom state.

2. A focus control method of an image-taking apparatus, wherein the image-taking apparatus comprises (a) an image pickup element which photoelectrically converts an image of an object formed by an image-taking optical system including a focusing lens, and (b) a signal processing circuit which produces an image signal based on an output signal from the image pickup element and has an electronic zoom function of electrically processing a part of the image signal to produce an enlarged output image, the focus control method comprising the steps of:
   controlling a drive of the focusing lens in a first control method based on a contrast component of the output signal from the image pickup element;
   controlling the drive of the focusing lens in a second control method based on a phase difference between two images of the object; and
   changing the control methods such that both of the first control method and the second control method are used in a first zoom state including at least a state in which the electronic zoom function is not used, and a use of the first control method is inhibited in a second zoom state in which the electronic zoom function is used to set a zoom magnification larger than a zoom magnification in the first zoom state.

3. An image-taking apparatus comprising:
   an image pickup element which photoelectrically converts an image of an object formed by an image-taking optical system including a focusing lens;
   a signal processing circuit which produces an image signal based on an output signal from the image pickup element and has an electronic zoom function of electrically processing a part of the image signal to produce an enlarged output image; and
   a focus control circuit which controls a drive of the focusing lens in a first control method based on a contrast component of the output signal from the image pickup element and in a second control method based on a distance to the object,
   wherein the focus control circuit uses both of the first control method and the second control method in a first zoom state including at least a state in which the electronic zoom function is not used, and uses only the second control method in a second zoom state in which the electronic zoom function is used to set a zoom magnification larger than a zoom magnification in the first zoom state.

4. A focus control method of an image-taking apparatus, wherein the image-taking apparatus comprises (a) an image pickup element which photoelectrically converts an image of an object formed by an image-taking optical system including a focusing lens, and (b) a signal processing circuit which produces an image signal based on an output signal from the image pickup element and has an electronic zoom function of electrically processing a part of the image signal to produce an enlarged output image, the focus control method comprising the steps of:
   controlling a drive of the focusing lens in a first control method based on a contrast component of the output signal from the image pickup element;
   controlling the drive of the focusing lens in a second control method based on a distance to the object; and
   changing the control methods such that both of the first control method and the second control method are used in a first zoom state including at least a state in which the electronic zoom function is not used, and a use of the first control method is inhibited in a second zoom state in which the electronic zoom function is used to set a zoom magnification larger than a zoom magnification in the first zoom state.

* * * * *